(12) United States Patent
Chung et al.

(10) Patent No.: US 10,693,359 B2
(45) Date of Patent: Jun. 23, 2020

(54) LINEAR VIBRATION GENERATOR INCLUDING STRUCTURE FOR PREVENTING DISCONNECTION OF COIL

(71) Applicant: MPLUS CO., LTD., Suwon-si, Gyeonggi-do (KR)

(72) Inventors: Seuk Hwan Chung, Suwon-si (KR); Nam Sock Kim, Suwon-si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 40 days.

(21) Appl. No.: 16/106,944

(22) Filed: Aug. 21, 2018

(65) Prior Publication Data

US 2019/0068039 A1    Feb. 28, 2019

(30) Foreign Application Priority Data

Aug. 25, 2017 (KR) .................. 10-2017-0107773

(51) Int. Cl.
*H02K 33/18* (2006.01)
*H02K 5/24* (2006.01)
(Continued)

(52) U.S. Cl.
CPC ............. *H02K 33/18* (2013.01); *B06B 1/045* (2013.01); *H02K 1/06* (2013.01); *H02K 1/34* (2013.01);
(Continued)

(58) Field of Classification Search
CPC ...... H02K 1/34; H02K 2203/03; H02K 33/16; H02K 1/06; H02K 2211/03; H02K 33/18;
(Continued)

(56) References Cited

U.S. PATENT DOCUMENTS

2005/0285454 A1* 12/2005 Choi ...................... B06B 1/045
                                                              310/14
2011/0291497 A1* 12/2011 Choi ...................... H02K 33/18
                                                              310/25

(Continued)

FOREIGN PATENT DOCUMENTS

CN          103683791 A      3/2014
CN          103997181 A      8/2014
(Continued)

OTHER PUBLICATIONS

KIPO Office Action, dated Feb. 15, 2019, for Korean Patent Application No. 10-2017-0107773 which corresponds to the above-identified U.S. application.

(Continued)

*Primary Examiner* — Alex W Mok
(74) *Attorney, Agent, or Firm* — LRK Patent Law Firm

(57) ABSTRACT

A technology for improving a device structure so that an external impact does not occur in a coil in order to solve a problem in that several attachments, such as coil, included in a linear vibration generator are separated or broken due to a small impact test or drop test on the linear vibration generator. The attachments, such as coil, included in the linear vibration generator can be prevented from being disconnected, separated or broken due to the execution of a small impact test and drop test on the linear vibration generator.

8 Claims, 14 Drawing Sheets

(51) Int. Cl.
*H02K 33/16* (2006.01)
*B06B 1/04* (2006.01)
*H02K 1/06* (2006.01)
*H02K 1/34* (2006.01)

(52) U.S. Cl.
CPC ............... *H02K 5/24* (2013.01); *H02K 33/16* (2013.01); *H02K 2203/03* (2013.01); *H02K 2211/03* (2013.01)

(58) Field of Classification Search
CPC .......... H02K 5/24; H02K 33/02; H02K 7/065; B06B 1/045
USPC .......................................................... 310/15
See application file for complete search history.

(56) References Cited

U.S. PATENT DOCUMENTS

| | | | | | |
|---|---|---|---|---|---|
| 2012/0119595 | A1* | 5/2012 | Choi | ........................ | B06B 1/045 310/25 |
| 2013/0057087 | A1* | 3/2013 | Jeon | ........................ | B06B 1/045 310/15 |
| 2013/0342034 | A1* | 12/2013 | Moon | ...................... | B06B 1/045 310/25 |
| 2013/0342035 | A1* | 12/2013 | Kim | ........................ | B06B 1/045 310/25 |
| 2014/0070633 | A1* | 3/2014 | Kim | ........................ | B06B 1/045 310/25 |
| 2014/0232211 | A1* | 8/2014 | Katada | ................... | H02K 33/00 310/25 |
| 2014/0252890 | A1* | 9/2014 | Lee | ........................ | H02K 33/16 310/25 |
| 2015/0123499 | A1* | 5/2015 | Park | ........................ | H02K 33/16 310/25 |
| 2016/0172950 | A1* | 6/2016 | Shim | ...................... | H02K 33/16 310/25 |
| 2016/0243589 | A1* | 8/2016 | Mori | ........................ | B06B 1/045 |

FOREIGN PATENT DOCUMENTS

| | | |
|---|---|---|
| CN | 105556814 A | 5/2016 |
| KR | 10-2005-0123358 A | 12/2005 |
| KR | 20-0447398 B1 | 1/2010 |
| KR | 10-2010-0064162 A | 6/2010 |
| KR | 10-2012-0051504 A | 5/2012 |
| KR | 1020130015721 A | 2/2013 |
| KR | 10-1744029 B1 | 6/2017 |

OTHER PUBLICATIONS

KIPO Notice of Allowance, dated Sep. 16, 2019, for Korean Patent Application No. 10-2017-0107773 which corresponds to the above-identified U.S. application.
KIPO Office Action, dated Oct. 17, 2018, in connection with Korean Patent Application No. 10-2017-0107773 which corresponds to the above-identified U.S. application.
SIPO Office Action dated Feb. 3, 2020 in connection with Chinese Patent Application No. 201810978395.0 which corresponds to the above-referenced U.S. application.

* cited by examiner

Section AA'

Section AA'

Section AA'

Section AA'

Section AA'

Section AA'

Section AA'

Section AA'

Section AA'

Section AA'

Section AA'

LINEAR VIBRATION GENERATOR INCLUDING STRUCTURE FOR PREVENTING DISCONNECTION OF COIL

CROSS REFERENCE TO RELATED APPLICATION

The present application claims the benefit of Korean Patent Application No. 10-2017-0107773 filed in the Korean Intellectual Property Office on Aug. 25, 2017, the entire content of which is incorporated herein by reference.

BACKGROUND OF THE INVENTION

1. Technical Field

The present invention relates to a linear vibration generator having a structure for preventing the disconnection of a coil included in the linear vibration generator and, more particularly, to a technology for improving a device structure so that an external impact does not occur in a coil in order to solve a problem in that several attachments (particularly, coil) included in the linear vibration generator are separated or broken due to a small impact test or drop test on the linear vibration generator.

2. Description of Related Art

The use of a device including a vibration generator (hereinafter referred to as a "vibration device"), such as a mobile phone or a vibration bell, is recently generalized. The development and supply of the vibration device is activated.

Accordingly, in a mobile phone including such a vibration device, there is a need for a technology for preventing a part from breaking down during a durability test on an internal device of a linear vibration generator.

In order to prevent a part from breaking down during a durability test on an internal device of a linear vibration generator as described above, the design in which the internal diameter of a spring and yoke disposed to face a coil is changed is required.

In a conventional technology, in general, the internal diameter of the spring and the yoke disposed to face the coil is designed to have the same size as that of the coil for convenience of assembly.

Accordingly, there is a need for a technology for preventing an impact from being applied to a coil by changing the internal diameter of a spring and a yoke disposed to face the coil while maintaining a gap between internal parts so that the vibration characteristic of a linear vibration generator is not deteriorated.

PRIOR ART DOCUMENT

Patent Document (Patent Document 0001) Korean Patent Application Publication No. 2010-0064162

SUMMARY OF THE INVENTION

The present invention has been made keeping in mind the above problems occurring in the prior art, and an object of the present invention is to prevent several attachments (particular, coil) included in a linear vibration generator from being separated or broken due to a durability test on a device including the linear vibration generator by improving a device structure so that an external impact does not occur in a coil.

An embodiment of the present invention may provide a linear vibration generator having a structure for preventing the disconnection of a coil, including a casing configured to cover the top and side of the linear vibration generator, a bracket configured to form the bottom of the linear vibration generator, a coil fixed to one side of the top of the bracket and applied with external power from a flexible printed circuit board (FPCB), a spring fixed to the bracket and configured to have an internal diameter greater than the external diameter of the coil and to surround the coil, a magnet fixed to the other end of the spring to form a vibrator, a mass fixed to the magnet to surround the magnet, and a yoke coupled to the bottom of the magnet and the mass to fix one end of the spring and the magnet and the mass. The internal diameter of a portion belonging to the spring and coming into contact with the magnet and the internal diameter of the yoke are greater than the internal diameter of the magnet.

In this case, the outside of a cross section of the mass has a doughnut structure having a circle. The height of a processing surface tapered at the upper part of the outside of the mass may be ⅓ or more of a total height of the mass.

Alternatively, the outside of a cross section of the mass may have a doughnut structure having a circle, protruded parts of a stripe form having a specific width may be formed on the outside of the mass, and the protruded parts may be formed to surround an entire outside of the mass. Alternatively, the outside of a cross section of the mass may have a doughnut structure having a circle, two or more protruded parts having a specific width may be formed on the outside of the mass, and the protruded parts may be arranged on the outside of the mass in a circumferential direction. Alternatively, the outside of a cross section of the mass may have a doughnut structure having a circle, an upper processing surface and lower processing surface tapered at the upper part and lower part of the outside of the mass, respectively, may be disposed, and the upper processing surface and the lower processing surface may come into contact with each other to form a processed protruded part.

Furthermore, the outside of a cross section of the mass may have a doughnut structure having a square shape, and the height of a processing surface tapered at the upper part of the outside of the mass may be ⅓ or more of a total height of the mass.

Alternatively, the outside of a cross section of the mass may have a doughnut structure having a square shape, a protruded part of a stripe form having a specific width may be formed on the outside of the mass, and the protruded part may be formed to surround the entire outside of the mass. Alternatively, the outside of a cross section of the mass may have a doughnut structure having a square shape, two or more protruded parts having a specific width may be formed on the outside of the mass, and the protruded parts may be arranged on the outside of the mass in a circumferential direction. Alternatively, the outside of a cross section of the mass may have a doughnut structure having a circle, an upper processing surface and lower processing surface tapered at the upper part and lower part of the outside of the mass, respectively, may be disposed, and the upper processing surface and the lower processing surface may come into contact with each other to form a processed protruded part.

DETAILED DESCRIPTION

Figure 1:
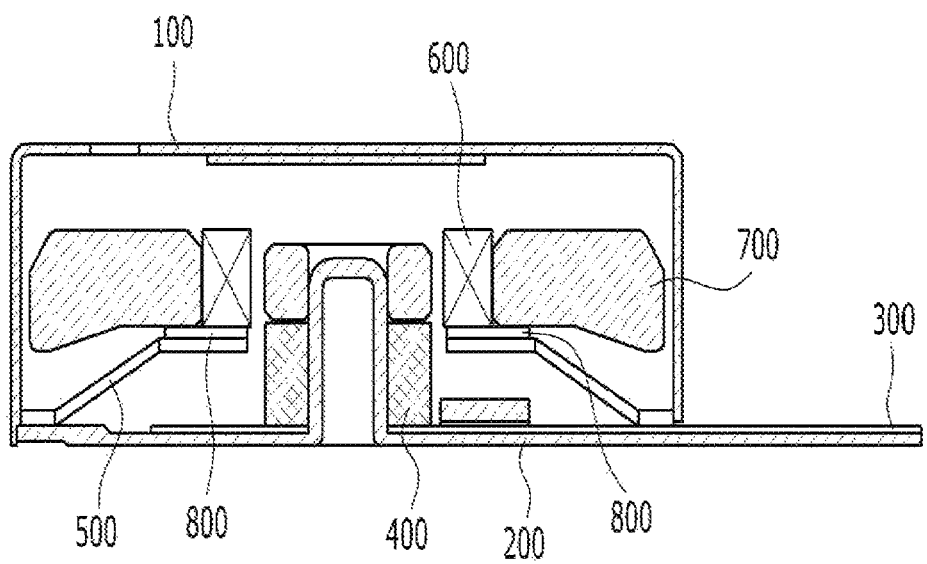
FIG. 1 is a front sectional view of a linear vibration generator according to an embodiment of the present invention.

Hereinafter, some embodiments of the present invention are described in detail with reference to exemplary drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of the embodiments of the present invention, terms, such as the first, the second, A, B, (a), and (b), may be used. However, although the terms are used only to distinguish one element from the other element, the essence, order, or sequence of the elements is not limited by the terms. When it is said that one element is "connected", "combined", or "coupled" to the other element, the one element may be directly connected or coupled" to the other element, but it should also be understood that a third element may be "connected", "combined", or "coupled" between the two elements.

The present invention relates to a linear vibration generator having a structure for preventing the disconnection of a coil included in the linear vibration generator. More specifically, the present invention relates to a technology for improving a device structure so that an external impact does not occur in a coil in order to solve a problem in that several attachments (particularly, coil) included in a linear vibration generator are separated or broken due to a small impact test or drop test on the linear vibration generator for the reliability review of the several attachments.

According to an embodiment of the present invention, several attachments (particularly, coil) included in a linear vibration generator can be prevented from being disconnected, separated or broken due to the execution of a small impact test or drop test on the linear vibration generator.

FIG. 1 is a front sectional view of a linear vibration generator according to an embodiment of the present invention.

FIG. 1 shows the internal elements of the linear vibration generator according to an embodiment of the present invention.

Specifically, the linear vibration generator according to an embodiment of the present invention includes a casing 100 configured to cover the top and side of the linear vibration generator, a bracket 200 configured to form the bottom of the linear vibration generator, a coil 400 fixed to one side of the top of the bracket 200 and applied with external power from a flexible printed circuit board (FPCB) 300, a spring 500 configured to have an internal diameter greater than the external diameter of the coil 400 and to surround the coil 400 and fixed to the bracket 200, a magnet 600 fixed to the other end of the spring 500 to form a vibrator, a mass 700 fixed to the magnet 600 to surround the magnet 600, and a yoke 800 coupled to the bottom of the magnet 600 and the mass 700 to fix one end of the spring 500 and the magnet 600 and the mass 700. The linear vibration generator may include a structure for preventing the disconnection of the coil, in which the internal diameter of a portion belonging to the spring 500 and coming into contact with the magnet 600 and the internal diameter of the yoke 800 are greater than the internal diameter of the magnet 600.

In order to firmly support and fix the magnet 600 and the mass 700, the internal diameter of a portion belonging to the spring 500 and coming into contact with the magnet 600 and the internal diameter of the yoke 800 are greater than the internal diameter of the magnet 600 of a doughnut form, but are half or less of the width of the magnet 600.

In this case, several attachments (particularly, coil) included in the linear vibration generator can be prevented from being separated or broken due to the execution of a small impact test and drop test on the linear vibration generator by preventing an impact between the coil and the yoke and between the coil and the spring and to induce a preemptive impact with the magnet.

Detailed embodiments for additionally achieving a reduction of an impact and noise according to the wobble phenomenon of a vibrator included in the linear vibration generator in addition to the object and effects of the invention are described below.

Figure 2:
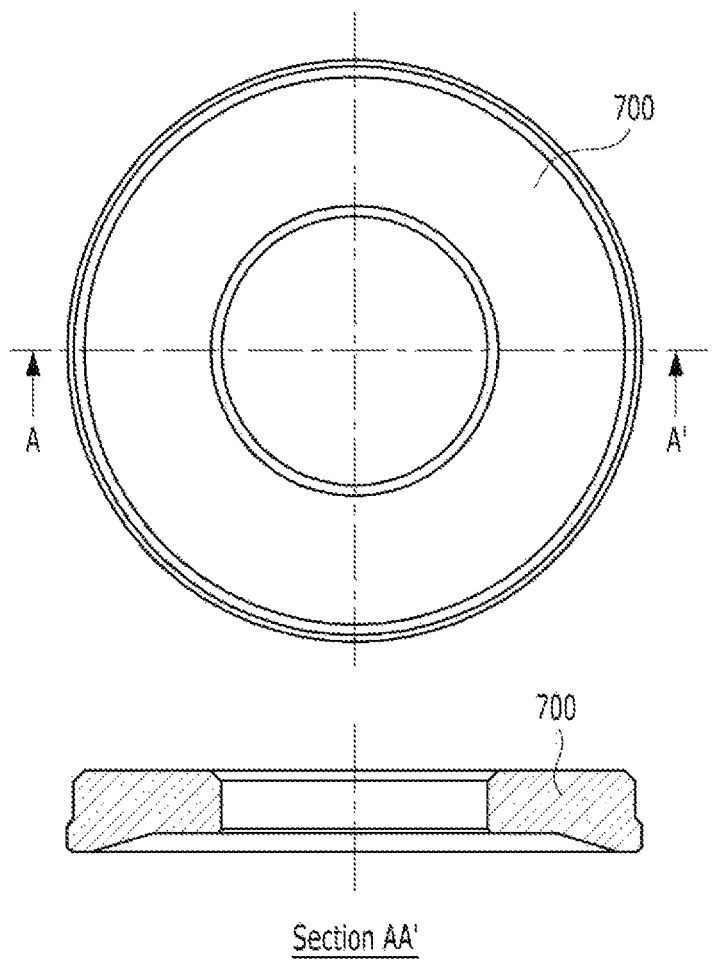
FIG. 2 is a front view and top view of a circular mass including a circular mass having a shape of two or more different diameters or circumferences according to an embodiment of the present invention.

FIG. 2 is a front view and top view of a circular mass including a circular mass having a shape of two or more different diameters or circumferences according to an embodiment of the present invention.

FIG. 2 shows a detailed configuration of the mass 700 having different diameters or circumferences according to an embodiment of the present invention.

The mass 700 having different diameters or circumferences may have a part protruded to the outside of the mass or a protruded shape of a stepwise structure, but may have a configuration having a cutting shape of a specific depth by processing the outside of the upper part of the mass.

Figure 3:
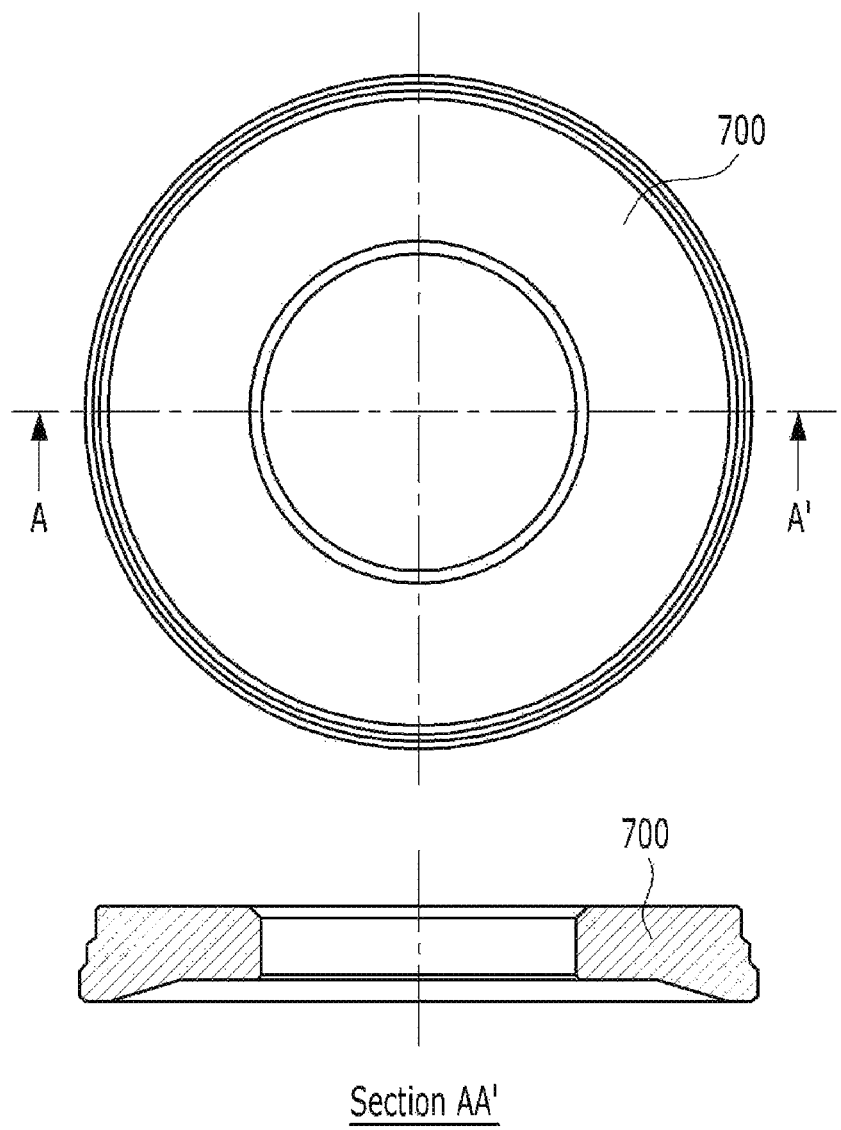
FIG. 3 is a front view and top view of a mass including a circular mass having a shape of three or more different diameters or circumferences according to an embodiment of the present invention.

FIG. 3 is a front view and top view of a mass including a circular mass having a shape of three or more different diameters or circumferences according to an embodiment of the present invention.

FIG. 3 shows a detailed configuration of the mass 700 having different diameters or circumferences according to an embodiment of the present invention.

The mass having three or more different diameters or circumferences may have three or more different diameters or circumferences, and specifically may have a shape, such as that of FIG. 3.

The mass 700 having such a multi-stage structure may have diameters or circumferences greater from top to bottom in order to prevent interference between the top corner of the mass and the inside of the casing 100.

Figure 4:
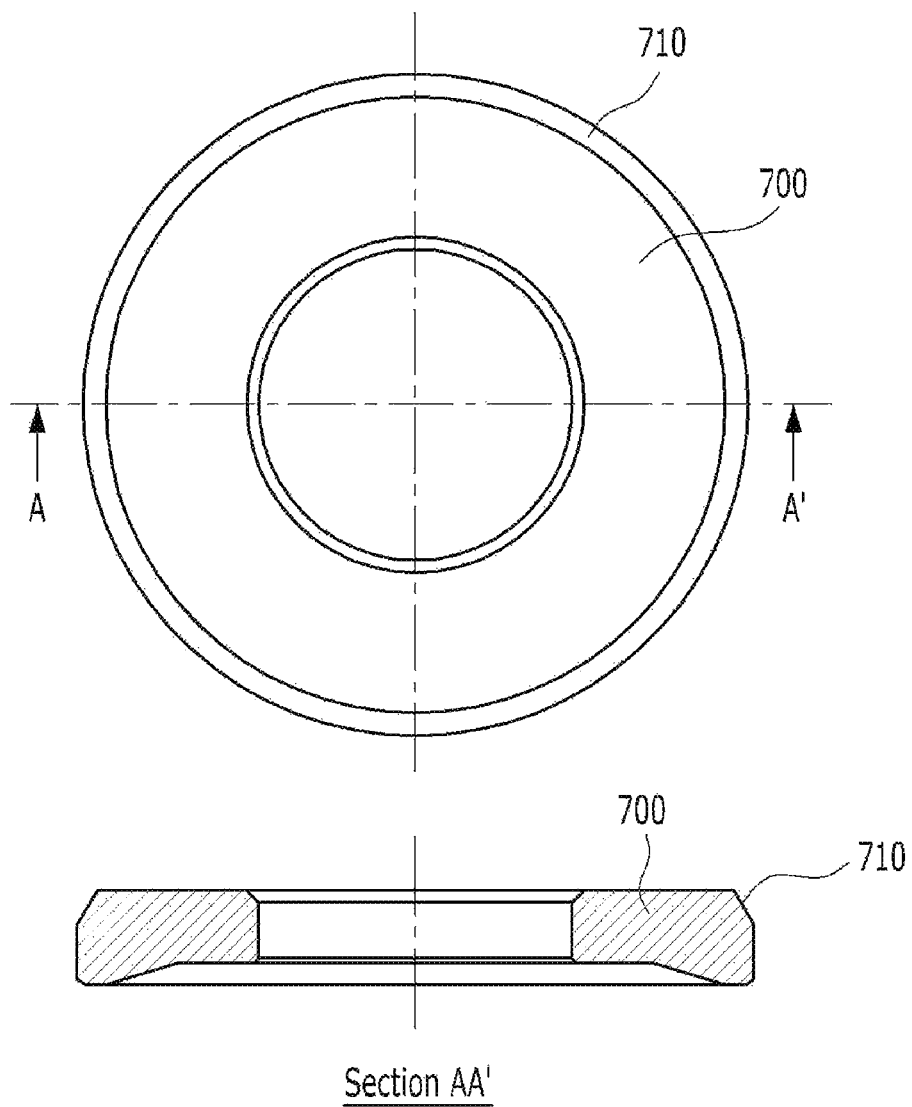
FIG. 4 is a front view and top view of a circular mass having a processing surface tapered at the upper part of the outside according to an embodiment of the present invention.

FIG. 4 is a front view and top view of a circular mass having a processing surface tapered at the upper part of the outside according to an embodiment of the present invention.

Referring to FIG. 4, the mass 700 according to an embodiment of the present invention includes a processing surface 710 tapered at the top corner of the mass at a given angle, thereby being capable of avoiding a contact between the mass 700 and the casing 100 even in a wobble phenomenon.

When the mass 700 is driven up and down and vibrated left and right according to the wobble phenomenon, the top corner part of the mass 700 has the greatest displacement. If taper processing having a given angle is performed on the corner part, the same effect as that of the mass having the multi-stage structure of different diameters or circumferences can be obtained.

Figure 5:
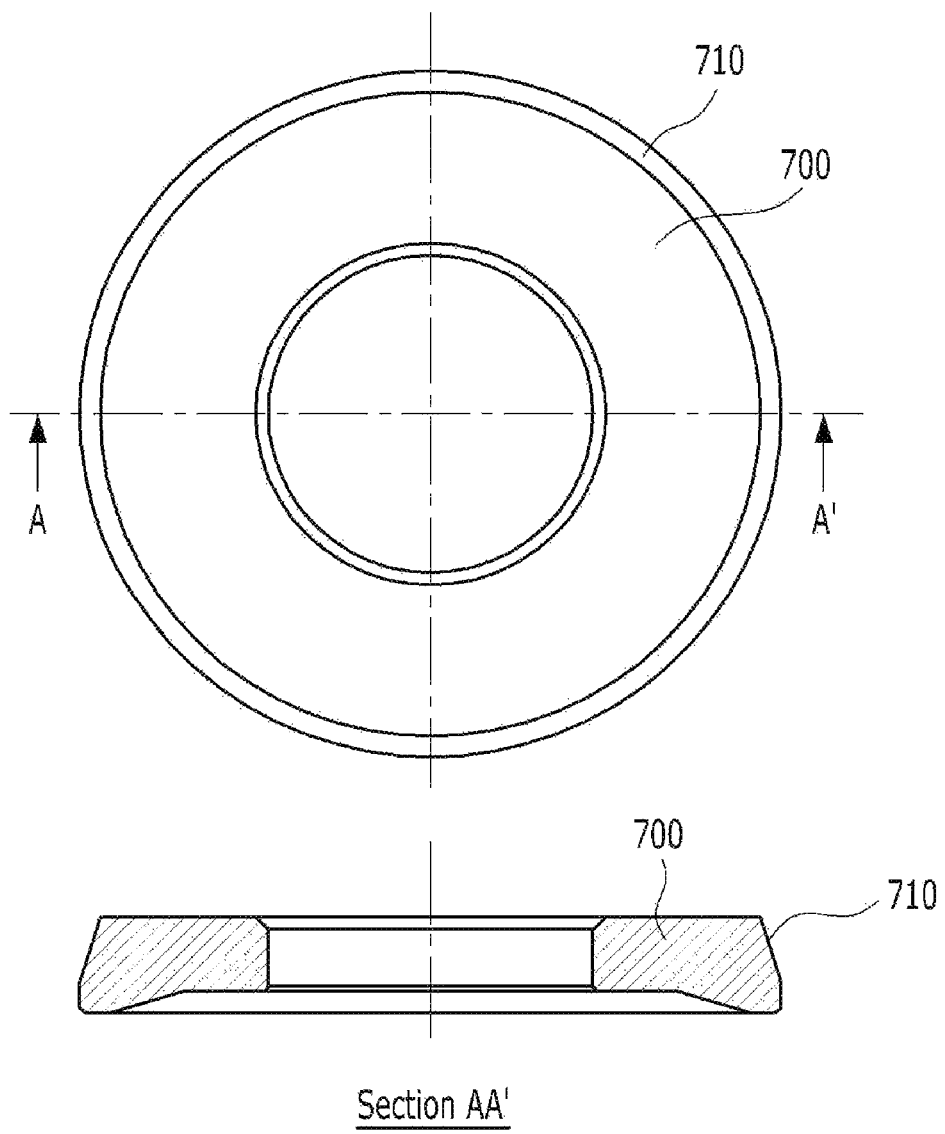
FIG. 5 is a front view and top view of a circular mass in which a processing surface tapered at the upper part of the outside is ⅓ or more of a total height of the circular mass according to an embodiment of the present invention.

FIG. 5 is a front view and top view of a circular mass in which a processing surface tapered at the upper part of the outside is ⅓ or more of a total height of the circular mass according to an embodiment of the present invention.

Specifically, the mass 700 has a doughnut structure in which the outside of a cross section has a circular shape. The height of a processing surface 710 tapered at the upper part of the outside of the mass 700 may be ⅓ or more of a total height of the mass 700. If the processing surface tapered at the upper part of the outside is ⅓ or more of the total height of the mass as described above, the occurrence of an impact and noise can be reduced because a contact with the inside of the casing is significantly reduced.

Figure 6:
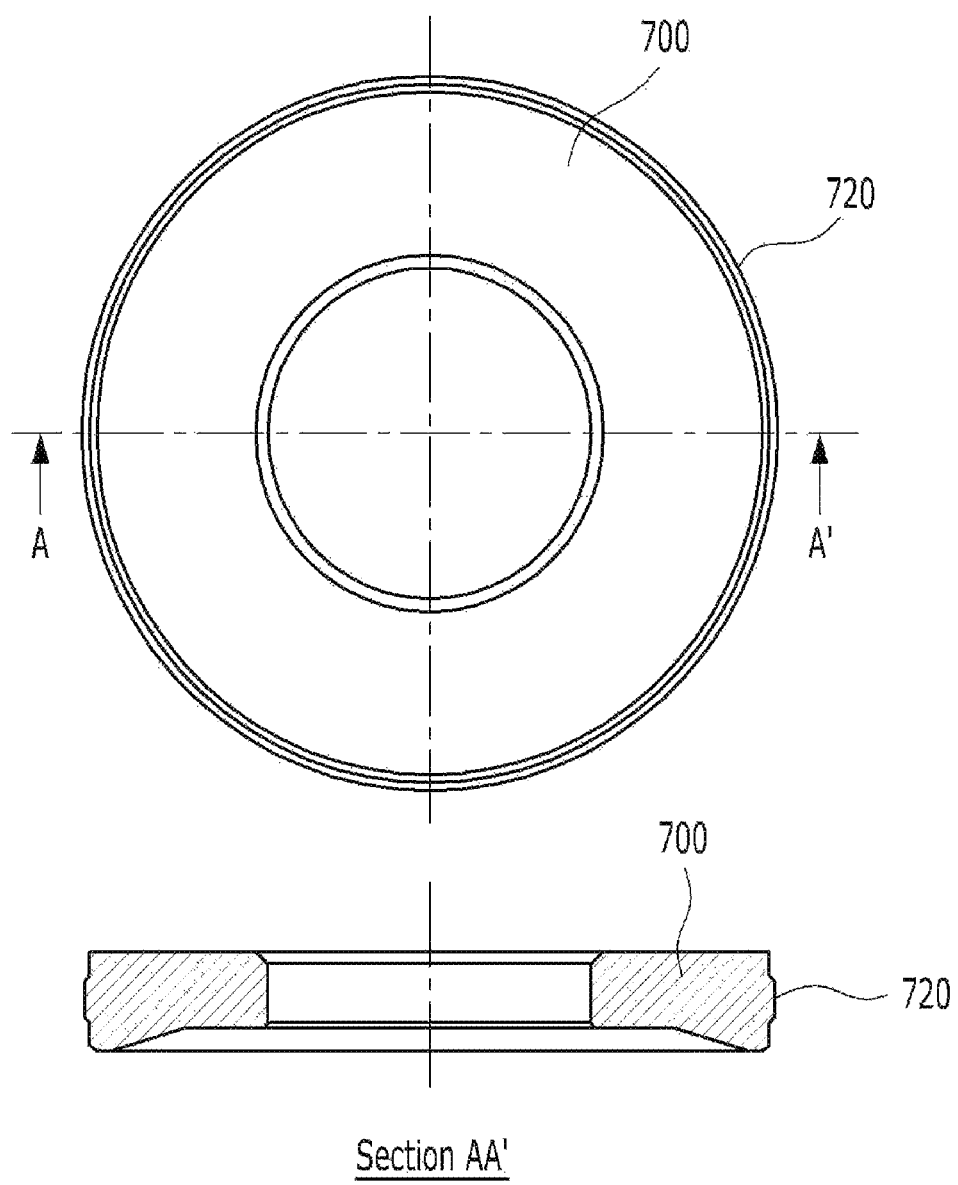
FIG. 6 is a front view and top view of a circular mass in which a protruded part of a stripe form having a specific width is formed on the outside according to an embodiment of the present invention.

FIG. 6 is a front view and top view of a circular mass in which a protruded part of a stripe form having a specific width is formed on the outside according to an embodiment of the present invention.

FIG. 6 shows a mass 700 including a protruded part 720 formed to surround the side of the mass 700.

As described above, in the mass 700 according to an embodiment of the present invention, the outside of the cross section is formed to have a doughnut structure having a circle, and the protruded part 720 of a stripe form having a specific width may be formed on the outside of the mass 700. The mass configuration in which the protruded part 720 is formed to surround the entire outside of the mass 700 has further materialized the shape of the mass including the shape having two or more different diameters or circumferences. In this case, an effect that contact frequency and contact intensity between the inside of the casing 100 and the top corner part of the mass 700 are reduced can be maximized.

Figure 7:
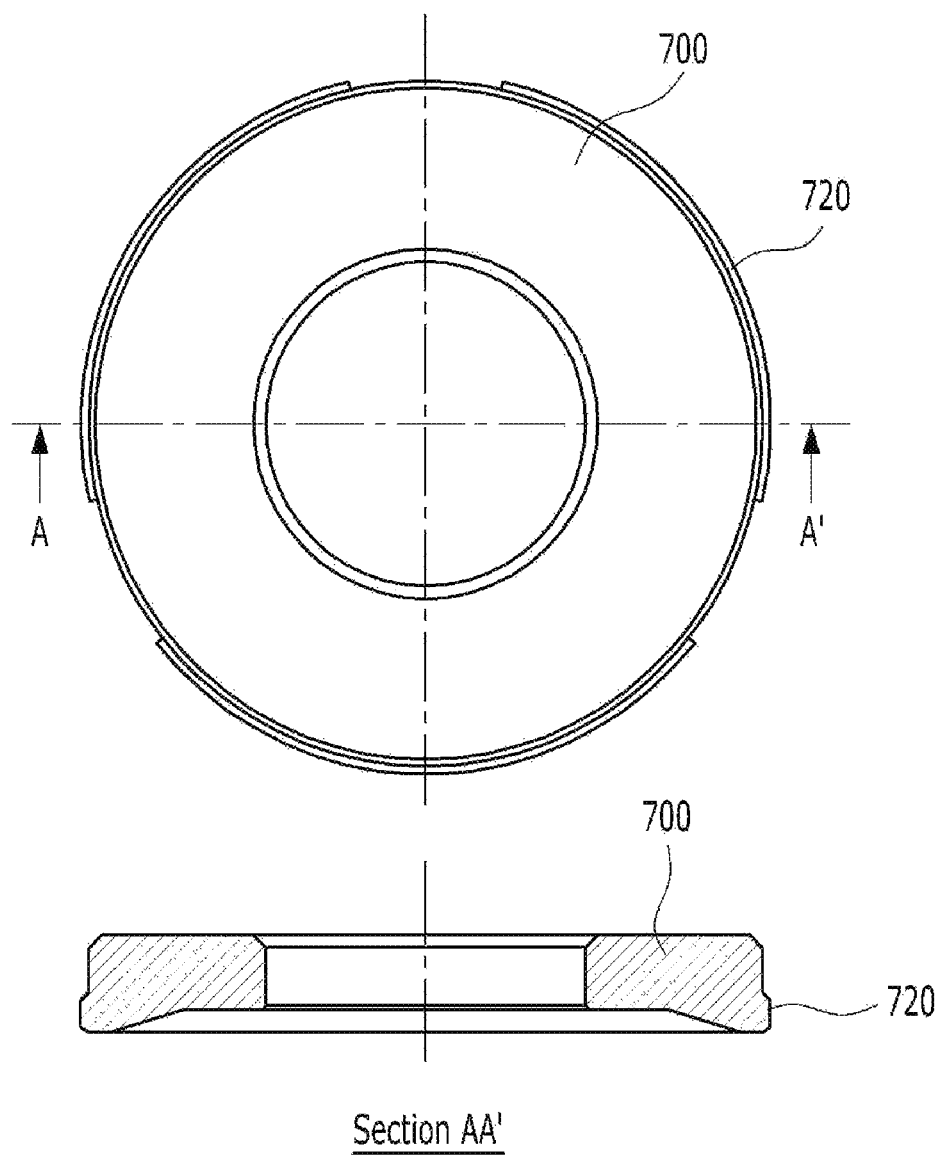
FIG. 7 is a front view and top view of a circular mass in which two or more protruded parts having a specific width are disposed on the outside in a circumferential direction according to an embodiment of the present invention.

FIG. 7 is a front view and top view of a circular mass in which two or more protruded parts having a specific width are disposed on the outside in a circumferential direction according to an embodiment of the present invention.

As described above, the mass 700 according to an embodiment of the present invention has a doughnut structure in which the outside of a cross section has a circle. Two or more protruded parts 720 having a specific width may be formed on the outside of the mass 700. Likewise, the mass configuration in which the protruded parts 720 are disposed on the outside of the mass 700 in a circumferential direction has further materialized the shape of the mass having the two or more different diameters or circumferences. An effect that contact frequency and contact intensity between the inside of the casing 100 and the top corner part of the mass 700 are reduced can be maximized.

Figure 8:
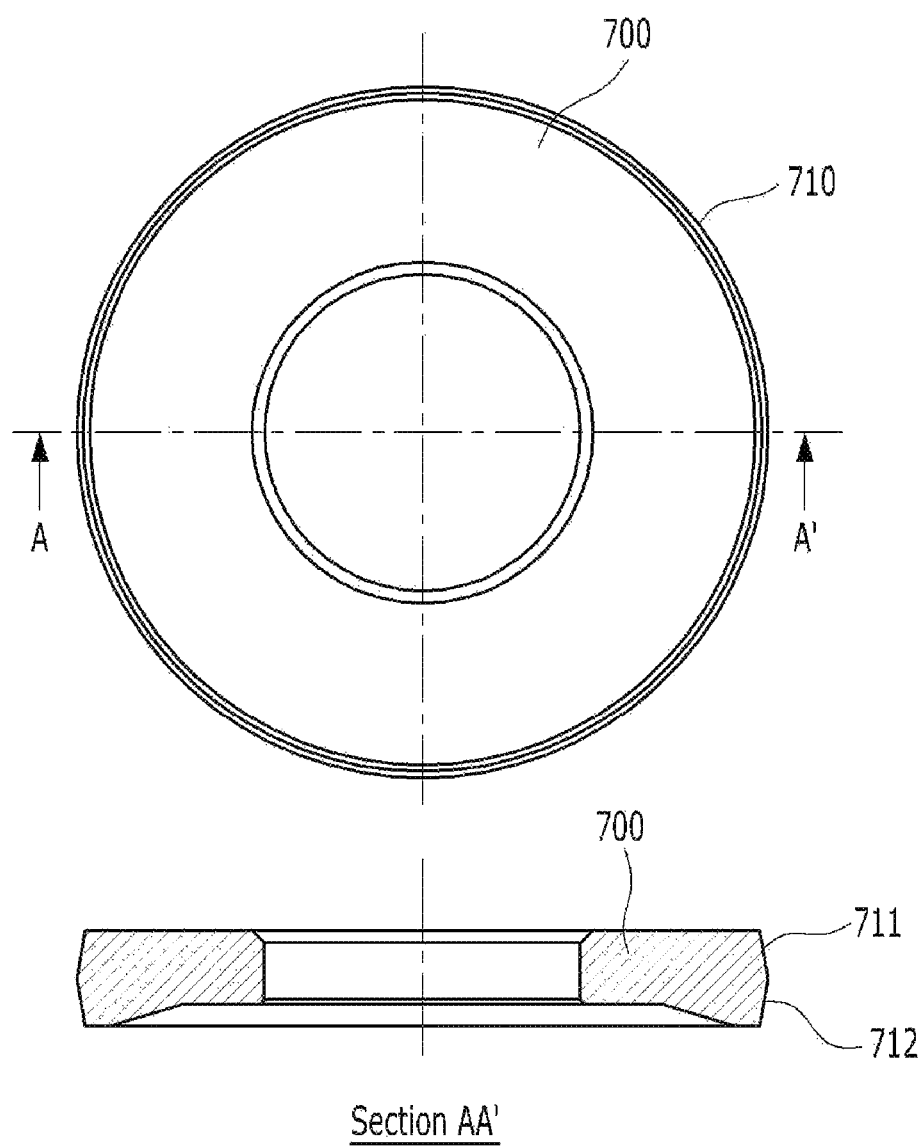
FIG. 8 is a front view and top view of a circular mass in which an upper processing surface and lower processing surface tapered at the upper part and lower part of the outside, respectively, are disposed according to an embodiment of the present invention.

FIG. 8 is a front view and top view of a circular mass in which an upper processing surface and lower processing surface tapered at the upper part and lower part of the outside, respectively, are disposed according to an embodiment of the present invention.

Referring to FIG. 8, the mass 700 according to an embodiment of the present invention has a doughnut structure in which the outside of a cross section has a circle. An upper processing surface 711 and a lower processing surface 712 that have been tapered are disposed at the upper part and lower part of the outside of the mass 700, respectively. The upper processing surface 711 and the lower processing surface 712 may come into contact with each other to form a processed protruded part.

A vibrator including the mass having the above configuration can maximize an effect that contact frequency and contact intensity between the inside of the casing 100 and the top corner part of the mass 700 are reduced through given angle taper processing for the upper and lower parts without performing processing for forming a separate protruded part.

Figure 9:
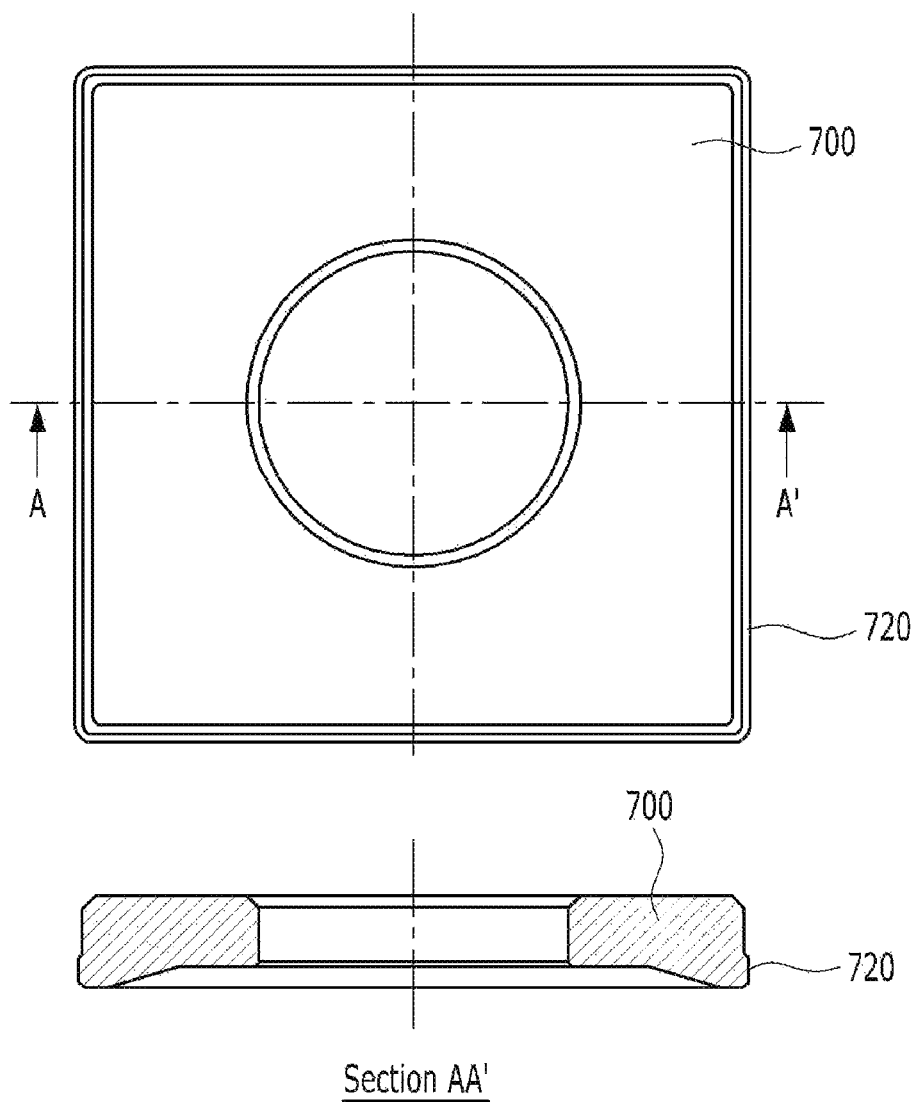
FIG. 9 is a front view and top view of a square mass including a circular mass having a shape of two or more different diameters or circumferences according to an embodiment of the present invention.

FIG. 9 is a front view and top view of a square mass including a circular mass having a shape of two or more different diameters or circumferences according to an embodiment of the present invention.

FIG. 9 shows a detailed configuration of a square mass 700 having different diameters or circumferences according to an embodiment of the present invention.

The square mass 700 having different diameters or circumferences may have a protruded part or a protruded shape of a stepwise structure on the outside of the mass. The square mass may have a configuration having a cutting shape of a specific depth by processing the outside of the upper part of the square mass.

Figure 10:
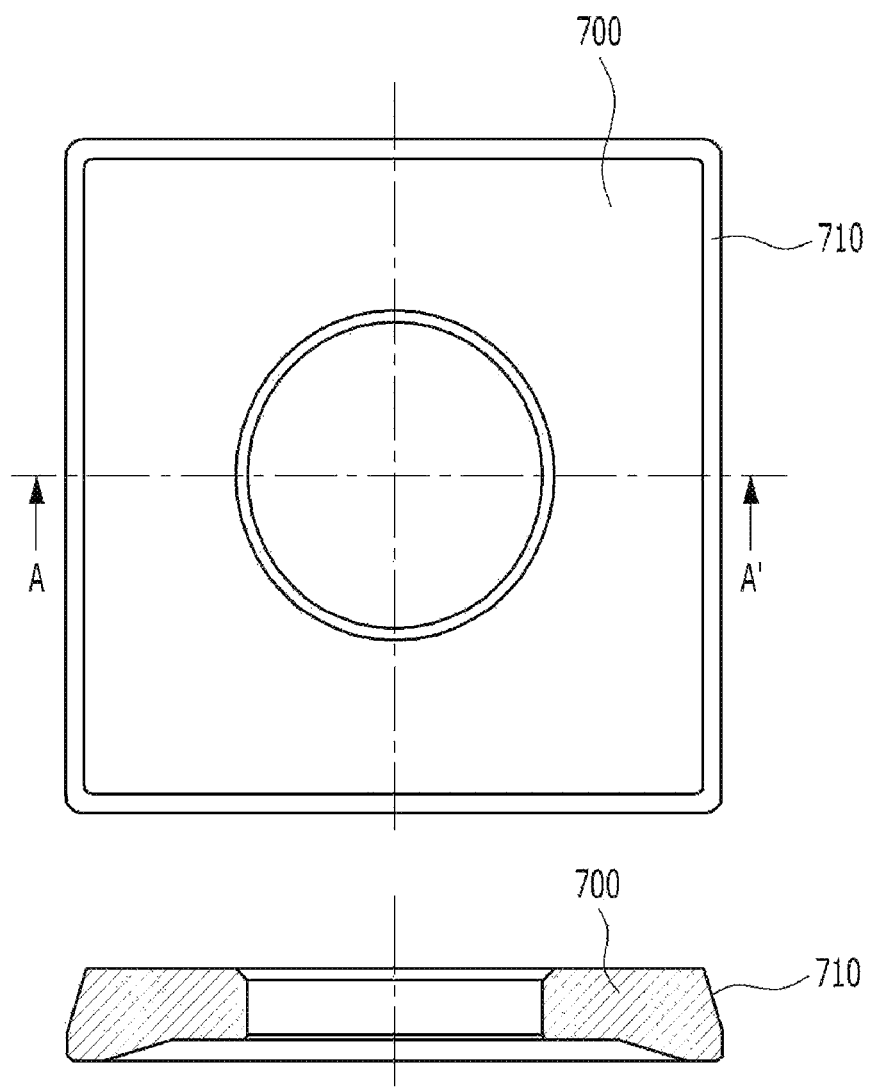
FIG. 10 is a front view and top view of a square mass in which a processing surface tapered at the upper part of the outside is ⅓ or more of a total height of the square mass according to an embodiment of the present invention.

FIG. 10 is a front view and top view of a square mass in which a processing surface tapered at the upper part of the outside is ⅓ or more of a total height of the square mass according to an embodiment of the present invention.

Specifically, the mass 700 has a doughnut structure in which the outside of a cross section has a square shape. The height of a processing surface 710 tapered at the upper part of the outside of the mass 700 may be ⅓ or more of a total height of the mass 700. If the processing surface 710 tapered at the upper part of the outside of the mass 700 is ⅓ or more of a total height of the mass 700 as described above, the occurrence of an impact and noise can be reduced because a contact with the inside of the casing is significantly reduced.

Figure 11:
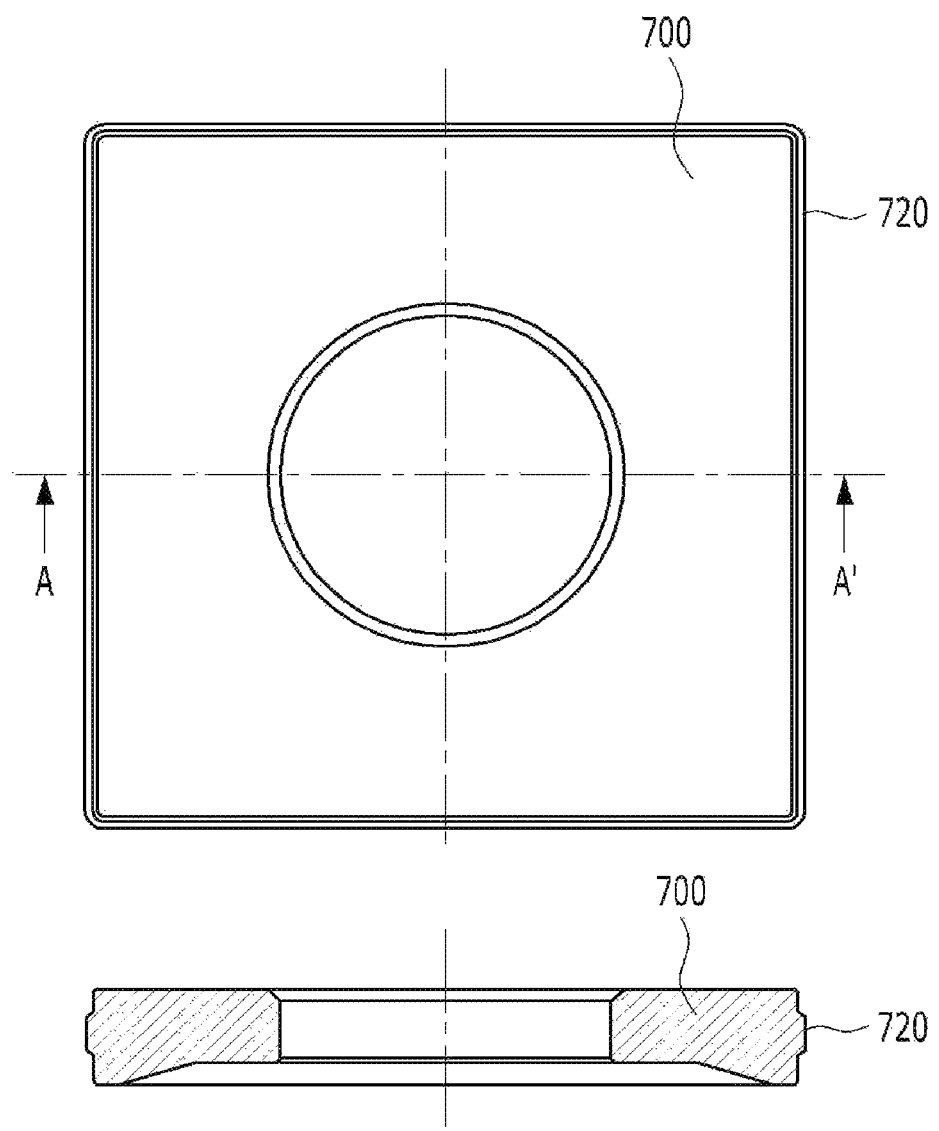
FIG. 11 is a front view and top view of a square mass in which a protruded part of a stripe form having a specific width is formed on the outside according to an embodiment of the present invention.

FIG. 11 is a front view and top view of a square mass in which a protruded part of a stripe form having a specific width is formed on the outside according to an embodiment of the present invention.

FIG. 11 shows a square mass including the configuration of a protruded part formed to surround the side of the mass.

As described above, the mass 700 according to an embodiment of the present invention has a doughnut structure in which the outside of a cross section has a square shape. A protruded part 720 of a stripe form having a specific width may be formed on the outside of the mass 700. The mass configuration in which the protruded part 720 is formed to surround the entire outside of the mass 700 has further materialized the shape of the mass having the two or more different diameters or circumferences. An effect that contact frequency and contact intensity between the inside of the casing 100 and the top corner part of the mass 700 are reduced can be maximized.

Figure 12:
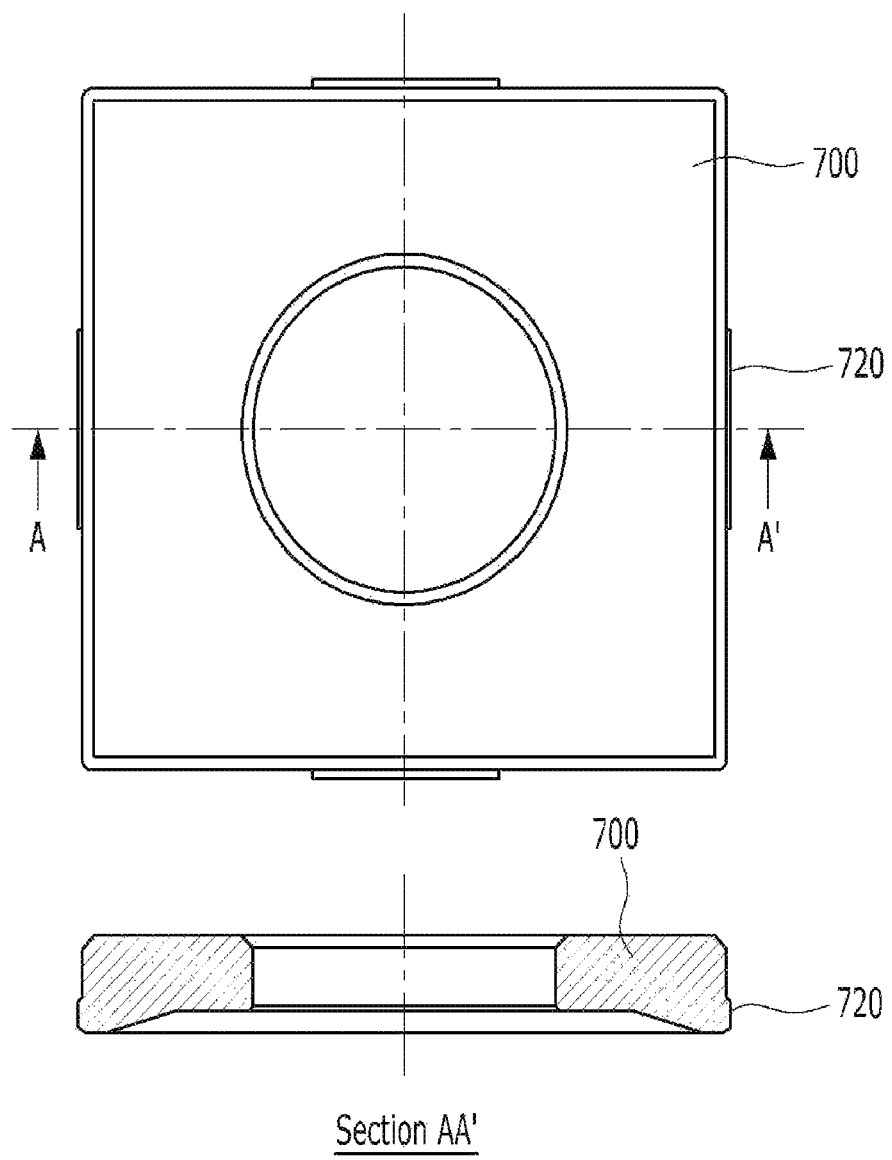
FIG. 12 is a front view and top view of a square mass in which two or more protruded parts having a specific width are disposed on the outside in a circumferential direction according to an embodiment of the present invention.

FIG. 12 is a front view and top view of a square mass in which two or more protruded parts having a specific width are disposed on the outside in a circumferential direction according to an embodiment of the present invention.

Figure 13:
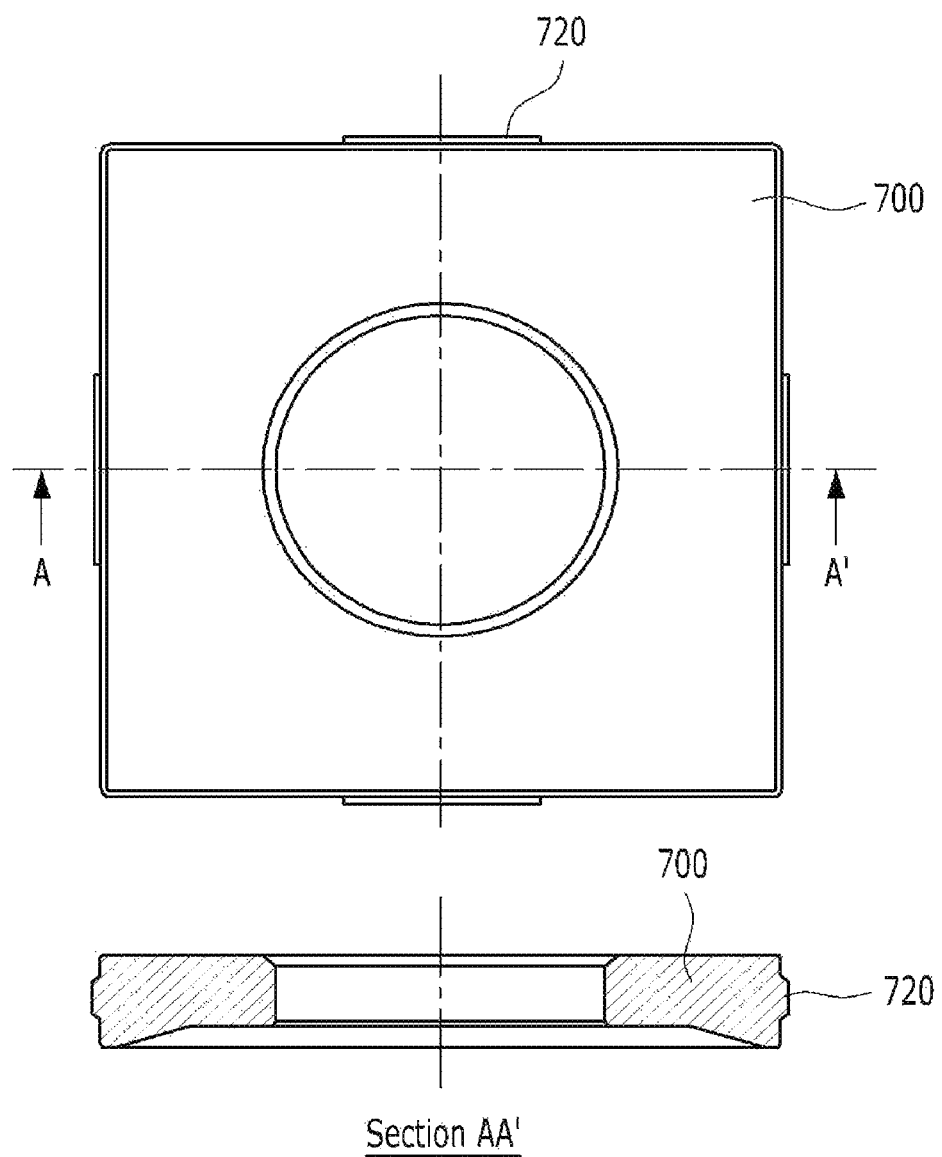
FIG. 13 is a front view and top view of a square mass in which two or more protruded parts having a specific width are disposed on the outside in a circumferential direction according to an embodiment of the present invention.

FIG. 13 is a front view and top view of a square mass in which two or more protruded parts having a specific width are disposed on the outside in a circumferential direction according to an embodiment of the present invention.

Referring to FIGS. 12 and 13, the mass 700 according to an embodiment of the present invention has a doughnut structure in which the outside of a cross section has a square shape. Two or more protruded parts 720 having a specific width may be formed on the outside of the mass 700. Likewise, the mass configuration in which the protruded parts 720 are disposed on the outside of the square mass 700 in a circumferential direction has further materialized the shape of the mass having the shape including the two or more different diameters or circumferences. An effect that contact frequency and contact intensity between the inside of the casing 100 and the top corner part of the mass are reduced can be maximized.

Figure 14:
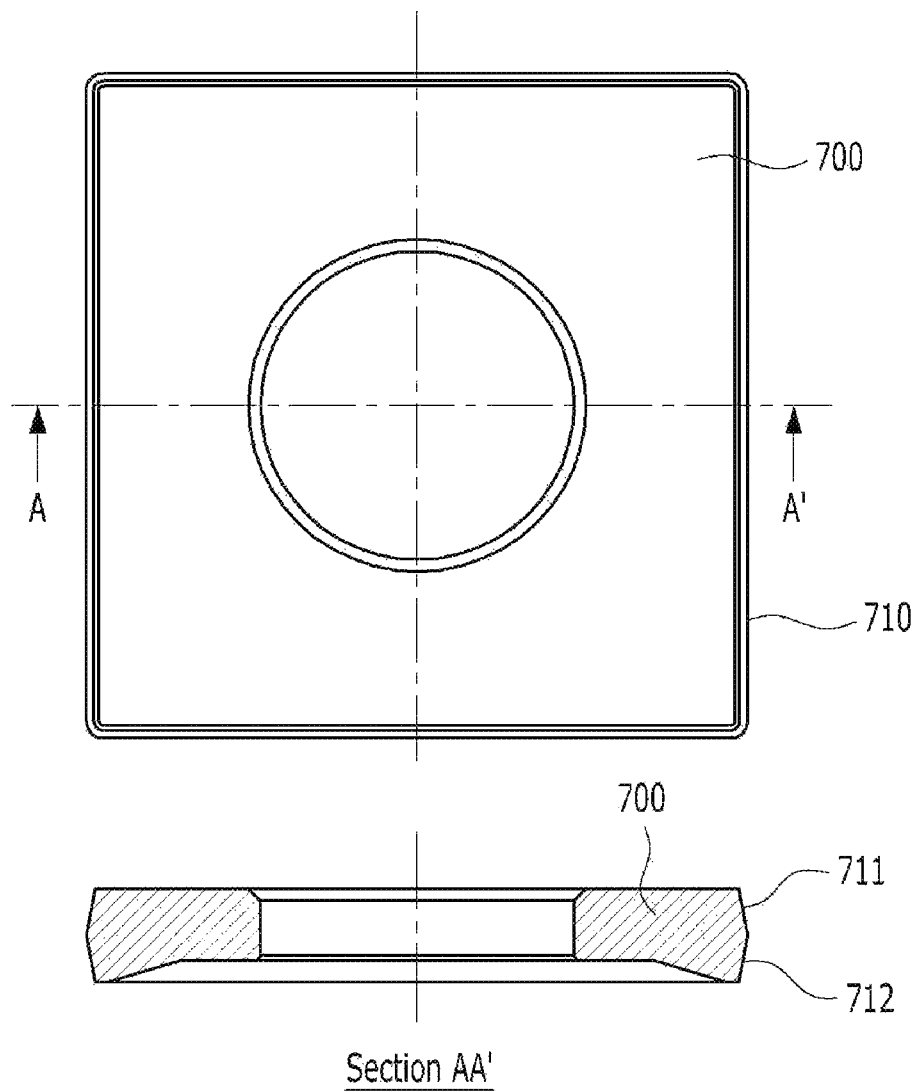
FIG. 14 is a front view and top view of a square mass in which an upper processing surface and lower processing surface tapered at the upper part and lower part of the outside, respectively, are positioned according to an embodiment of the present invention.

FIG. 14 is a front view and top view of a square mass in which an upper processing surface and lower processing surface tapered at the upper part and lower part of the outside, respectively, are positioned according to an embodiment of the present invention.

Referring to FIG. 14, the mass 700 according to an embodiment of the present invention has a doughnut structure in which the outside of a cross section has a square shape. An upper processing surface 711 and lower processing surface 712 on which taper processing has been performed are disposed at the upper part and lower part of the outside of the mass 700, respectively. The upper processing surface 711 and the lower processing surface 712 may come into contact with each together to form a processed protruded part.

A vibrator including the square mass having the above configuration can maximize an effect that contact frequency and contact intensity between the inside of the casing 100 and the top corner part of the mass 700 are reduced through given angle taper processing for the upper and lower parts without performing processing for forming a separate protruded part.

Several attachments (particularly, coil) included in the linear vibration generator can be prevented from being disconnected, separated or broken due to the execution of a small impact test and drop test on the linear vibration generator according to an embodiment of the present invention.

The above description is merely a description of the technical spirit of the present invention, and those skilled in the art may change and modify the present invention in various ways without departing from the essential characteristic of the present invention. Accordingly, the embodiments disclosed in the present invention should not be construed as limiting the technological spirit of the present invention, but should be construed as illustrating the technological spirit of the present invention. The scope of the technological spirit of the present invention is not restricted by the embodiments, and the range of protection of the present invention should be interpreted based on the following appended claims.

Accordingly, the range of protection of the present invention should be construed based on the following claims, and a full technological spirit within an equivalent range thereof should be construed as being included in the scope of right of the present invention.

What is claimed is:

1. A linear vibration generator comprising a structure for preventing a disconnection of a coil, the linear vibration generator comprising:
   a casing (100) configured to cover a top and side of the linear vibration generator;
   a bracket (200) configured to form a bottom of the linear vibration generator;
   a coil (400) fixed to one side of a top of the bracket (200) and applied with external power from a flexible printed circuit board (FPCB) (300);
   a spring (500) fixed to the bracket (200) at a first end of the spring (500) and configured to have an internal diameter greater at a second end of the spring (500) than an external diameter of the coil (400) and to surround the coil (400);
   a magnet (600) configured to have an internal diameter greater than the external diameter of the coil (400) and fixed to the second end of the spring (500) to form a vibrator;
   a mass (700) fixed to the magnet (600) to surround the magnet (600); and
   a yoke (800) fixed to the second end of the spring (500) at a bottom of the yoke (800), and coupled to a bottom of the magnet (600) and a bottom of a part of the mass (700) at a top of the yoke (800),
   wherein an internal diameter of the yoke (800) and the internal diameter of the second end of the spring (500) are each greater than the internal diameter of the magnet (600),
   wherein a radius of the internal diameter of the yoke (800) and a radius of the internal diameter of the second end of the spring (500) are each greater than a radius of the internal diameter of the magnet (600) within a range of a half or less of a width of the magnet (600).

2. The linear vibration generator of claim 1, wherein:
   the mass (700) has a doughnut structure in cross section with an outside of the mass (700) being formed of a circle in cross section, and a height of a processing surface (710) tapered at an upper part of the outside of the mass (700) is ⅓ or more of a total height of the mass (700).

3. The linear vibration generator of claim 1, wherein:

the mass (700) has a doughnut structure in cross section with an outside of the mass (700) being formed of a circle in cross section, protruded parts (720) of a stripe form each having a specific width are formed on the outside of the mass (700), and the protruded parts (720) are formed to surround an entire outside of the mass (700).

4. The linear vibration generator of claim 1, wherein:

the mass (700) has a doughnut structure in cross section with an outside of the mass (700) being formed of a circle in cross section, two or more protruded parts (720) each having a specific width are formed on the outside of the mass (700), and the protruded parts (720) are arranged on the outside of the mass (700) in a circumferential direction.

5. The linear vibration generator of claim 1, wherein:

the mass (700) has a doughnut structure in cross section with an outside of the mass (700) being formed of a circle in cross section, an upper processing surface (711) and lower processing surface (712) tapered at upper part and lower part of the outside of the mass (700), respectively, are disposed, and the upper processing surface (711) and the lower processing surface (712) come into contact with each other to form a processed protruded part.

6. The linear vibration generator of claim 1, wherein:

the mass (700) has a doughnut structure in cross section with an outside of the mass (700) being formed of a square shape in cross section, and a height of a processing surface (710) tapered at an upper part of the outside of the mass (700) is ⅓ or more of a total height of the mass (700).

7. The linear vibration generator of claim 1, wherein:

the mass (700) has a doughnut structure in cross section with an outside of the mass (700) being formed of a square shape in cross section, a protruded part (720) of a stripe form having a specific width is formed on the outside of the mass (700), and the protruded part (720) is formed to surround an entire outside of the mass (700).

8. The linear vibration generator of claim 1, wherein:

the mass (700) has a doughnut structure in cross section with an outside of the mass (700) being formed of a square shape in cross section, two or more protruded parts (720) each having a specific width are formed on the outside of the mass (700), and the protruded parts (720) are arranged on the outside of the mass (700) in a circumferential direction.

\* \* \* \* \*